(12) United States Patent
Maragliulo

(10) Patent No.: US 10,233,886 B2
(45) Date of Patent: Mar. 19, 2019

(54) FLOW DISTRIBUTION MEASUREMENT OF A LIQUID SPRAY STREAM

(71) Applicant: Continental Automotive GmbH, Hannover (DE)

(72) Inventor: Marco Maragliulo, San Miniato (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 193 days.

(21) Appl. No.: 15/028,091

(22) PCT Filed: Sep. 4, 2014

(86) PCT No.: PCT/EP2014/068857
§ 371 (c)(1),
(2) Date: Apr. 8, 2016

(87) PCT Pub. No.: WO2015/051958
PCT Pub. Date: Apr. 16, 2015

(65) Prior Publication Data
US 2016/0245253 A1    Aug. 25, 2016

(30) Foreign Application Priority Data
Oct. 10, 2013   (EP) ..................................... 13188194

(51) Int. Cl.
*G01F 1/69* (2006.01)
*G01F 1/688* (2006.01)
(Continued)

(52) U.S. Cl.
CPC ............. *F02M 65/001* (2013.01); *G01F 1/69* (2013.01); *G01F 13/006* (2013.01); *G01F 13/008* (2013.01)

(58) Field of Classification Search
None
See application file for complete search history.

(56) References Cited

U.S. PATENT DOCUMENTS 3,472,080 A  * 10/1969  Ayvazian .................. G01F 1/00
                                                        73/204.25
5,419,190 A     5/1995  Boyd ........................ 73/204.25
(Continued)

FOREIGN PATENT DOCUMENTS

CN        103026038 A    4/2013    ............. F02D 41/20
DE    102007019927 B3    9/2008    ............... G01F 1/68
(Continued)

OTHER PUBLICATIONS

European Search Report, Application No. 13188194.8, 7 pages, dated Mar. 24, 2014.
(Continued)

*Primary Examiner* — Leslie J Evanisko
*Assistant Examiner* — Ruben C Parco, Jr.
(74) *Attorney, Agent, or Firm* — Slayden Grubert Beard PLLC

(57) ABSTRACT

A measurement device for measuring a flow distribution of a liquid spray stream which has been atomized by a nozzle may comprise: a sensing wire; at least one further sensing wire; an electric power supply; a measurement unit; and a second grid of parallel sensing wires. The sensing wires may be positioned within a spray volume of the liquid spray stream and arranged in parallel with respect to each other to form grids of parallel sensing wires. The electric power supply unit may supply an electric current to the sensing wires. The measurement unit may measure an ohmic resistance change of the sensing wires. The first axis defined by the parallel sensing wires of the first grid and a second axis defined by the parallel additional sensing wires of the second grid may enclose a slanted angle.

7 Claims, 4 Drawing Sheets

(51) Int. Cl.
*F02M 65/00* (2006.01)
*G01F 13/00* (2006.01)

(56) References Cited

U.S. PATENT DOCUMENTS

| | | | |
|---|---|---|---|
| 5,753,806 A * | 5/1998 | Ryan, III | F02D 41/28 239/74 |
| 6,053,037 A | 4/2000 | Kojima et al. | 73/114.46 |
| 9,103,458 B2 | 8/2015 | Wirkowski et al. | |
| 2006/0087526 A1* | 4/2006 | Massucci | B41J 2/125 347/12 |
| 2006/0090573 A1 | 5/2006 | Foss | 73/861.85 |

FOREIGN PATENT DOCUMENTS

| | | | |
|---|---|---|---|
| DE | 102011010461 A1 | 8/2012 | G01F 1/68 |
| JP | 1054819 A | 2/1998 | G01F 1/68 |
| WO | 2015/051958 A1 | 4/2015 | F02M 65/00 |

OTHER PUBLICATIONS

International Search Report and Written Opinion, Application No. PCT/EP2014/068857, 12 pages, dated Oct. 6, 2014.
Chinese Office Action, Application No. 201480055691.3, 12 pages, dated Jul. 21, 2017.

* cited by examiner

FLOW DISTRIBUTION MEASUREMENT OF A LIQUID SPRAY STREAM

CROSS-REFERENCE TO RELATED APPLICATIONS

This application is a U.S. National Stage Application of International Application No. PCT/EP2014/068857 filed Sep. 4, 2014, which designates the United States of America, and claims priority to EP Application No. 13188194.8 filed Oct. 10, 2013, the contents of which are hereby incorporated by reference in their entirety.

TECHNICAL FIELD

The present disclosure relates to the field of measuring a flow of a liquid spray stream and, in particular to a measurement device and a method for measuring a flow distribution of a liquid spray stream which has been atomized by a nozzle.

BACKGROUND

For combustion engines with both a small fuel consumption and a small pollutant emission it is necessary to have a good knowledge about the characterization of a fuel spray atomized by an injection valve operating as a nozzle for producing a pulsed fuel spray. This holds both (a) for the spray characteristic of a direct injection valve which injects the fuel spray directly into a combustion volume of the combustion engine and (b) for the spray characteristic of an injection valve which is located at an intake tract of a combustion engine.

It is known to characterize the spatial distribution of a fuel spray by a grid of cells placed at a defined distance from the spray nozzle. The amount of fuel collected in each cell is weighted after a defined amount of time or injection events and the outcome is a 2d distribution of total flow. This kind of characterization has a strong limitation in accuracy limited by the cells' dimension and most importantly yields only a static characterization. It is impossible to measure the spatial characteristic of a fuel spray as a function of time. However, a corresponding measurement device allowing for a fuel spray characterization as a function of time would be highly welcome in particular in the field of combustion engine engineering, where highly dynamic application like fuel injectors are used.

DE 102011010461 A1 discloses a method for determining flow velocity in gaseous and liquid media. A heating resistor and a temperature dependent measurement resistor are provided in contact with the media. The heating resistor is supplied with a periodically changing voltage and the flow velocity is determined from a change of resistance of the measurement resistor.

DE 102007019927 B3 discloses an arrangement for measuring the velocity distribution in a measurement cross-section to examine liquid or gas flows. The arrangement uses and modifies a grating sensor in which the excitation electrodes and the receiver electrodes in each crossing point of the grid are electrically connected with each other through a solid body with a temperature-dependent resistor. Each excitation electrode is connected with a three-pole analogue switch to connect the electrodes selectively to a heating voltage source, a measurement voltage source or ground potential. Each receiver electrode is connected to an analog switch to connect the receiver electrode either to a fixed reference potential or to a current-voltage converter.

SUMMARY

Some embodiments of the teachings of the present disclosure include a measurement device for measuring a flow distribution of a liquid spray stream which has been atomized by a nozzle, in particular for measuring a flow distribution of a fuel spray stream which has been atomized by an injection valve. The injection valve may be an injection valve for a vehicle. However, for measuring the flow distribution, the injection valve may be mounted in a test stand rather than in an internal combustion engine of the vehicle, for example. Thus, in some embodiments, the measurement device may be deployed as a test stand.

In some embodiments, the measurement device comprises a sensing wire, which can be positioned within a spray volume of the liquid spray stream, an electric power supply unit electrically connected with the sensing wire and configured for supplying an electric current flowing through the sensing wire, and a measurement unit electrically connected with the sensing wire to measure an ohmic resistance change of the sensing wire resulting from a cooling of the sensing wire caused by particles of the liquid spray stream impinging onto the sensing wire. By means of the electric current flowing through the sensing wire, the power supply unit is operable to heat the sensing wire.

The described measurement device is based on the idea that a heated sensing wire will be cooled down at least partially when a liquid or when liquid particles impinge on the wire. In accordance with the teachings of the present disclosure, the liquid particles are liquid particles of the fuel spray stream which flow distribution is supposed to be determined. The cooling effect caused by the impinging particles can be determined by measuring the ohmic resistance of the sensing wire, which—depending on the material of the sensing wire—will typically decrease in response to the cooling effect. Thereby, the degree of the resistance change is determined by the mass flow of the impinging liquid particles.

With the described measurement device the temporal evolution of the liquid spray stream can be measured. This of course requires a determination of the temporal course of the ohmic resistance of the sensing wire.

The ohmic resistance can be determined in different ways. For instance, the ohmic resistance can be measured by measuring a change of the current flowing through the sensing wire. In some embodiments, the current flowing through the sensing wire is kept constant (e.g. by means of a current source) and a voltage drop is measured between two ends of the sensing wire.

The cooling effect of the sensing wire—the cooling of the sensing wire caused by particles of the liquid spray stream which impinge onto the sensing wire—may rely on at least one of two different physical principles. A first physical principle is simply the cooling effect which is caused that comparatively cool liquid particles impinge on the sensing wire and receive a heat quantity from the sensing wire. In this case, cooling may be effected via heat conduction and/or convection, for example. The second physical principle is a possible state change of the liquid particles from the liquid state to the gaseous state. Thereby, an evaporation heat is consumed from the sensing wire which causes to a temperature decrease of that part of the sensing wire which part has been exposed to the liquid spray stream.

Absent of the liquid spray stream the electric current through the sensing wire typically leads to a starting temperature of the sensing wire which is significantly higher than the ambient temperature. The starting temperature of the sensing wire may be at least 50° C., and in some cases at least 100° C. or at least 200° C. A higher temperature may provide the advantage of a pronounced cooling effect of the sensing wire which can be measured in a reliable manner.

The liquid spray stream may be a fuel spray stream which has been atomized or ejected by an injection valve of a vehicle. The fuel may be gasoline, diesel, and/or bioethanol. As a consequence, when the described measurement device is employed in a combustion engine measurement equipment, the flow distribution of fuel to be injected (a) directly into a combustion chamber of the combustion engine and/or (b) into an intake tract of the combustion engine can be determined experimentally. The vehicle can be any kind of vehicle which uses a combustion engine. The vehicle may be, for example, a car, a truck, a plane, a helicopter, a boat, or a locomotive.

In some embodiments, the measurement device further comprises at least one further sensing wire, which can be positioned within the spray volume. Thereby, the electric power supply unit is electrically connected also with the further sensing wire and is configured for supplying a further electric current flowing through the further sensing wire, in particular for heating the further sensing wire. Further, the measurement unit is electrically connected with the further sensing wire and is configured for measuring an ohmic resistance change of the further sensing wire resulting from a cooling of the further sensing wire caused by particles of the liquid spray stream impinging onto the further sensing wire.

The described method may provide a temporal flow distribution that may not only be measured at the location of the sensing wire but also at the other location of the further sensing wire. As a consequence, additional information about the spatial distribution of the flow distribution of the liquid spray stream can be obtained by using the at least one further sensing wire.

In these embodiments, there is no electrical contact between the sensing wire and the at least one further sensing wire. This holds also for different further sensing wires which might be comprised by the described measurement device. In order to avoid such an electrical contact, the different sensing wires may be spatially arranged without any mechanical contact. Alternatively or in combination, the different wires may be insulated from each other, for example by means of an appropriate insulating coating.

In some embodiments, the sensing wire and the at least one further sensing wire are arranged in parallel with respect to each other. Thereby, a grid of parallel sensing wires is formed.

With the described parallel arrangement of the various sensing wires, in addition to the temporal course of the flow distribution also the spatial characteristics of the flow distribution of the liquid spray stream along one direction can be determined. Thereby, the direction along which the spatial flow distribution can be determined is along an axis which (a) is located within the plane being spanned by the parallel sensing wires and which (b) is oriented perpendicular to the longitudinal extension of the sensing wires.

The various sensing wires may be arranged with an equidistant spacing in between two neighboring sensing wires. Thereby, the spacing between two neighboring sensing wires defines the spatial resolution of the described measurement device.

In some embodiments, the sensing wire and the at least one further sensing wire form a first grid of parallel sensing wires. In addition, the measurement device comprises a second grid of parallel sensing wires which can be positioned within the spray volume of the liquid spray stream. The second grid comprises at least two parallel additional sensing wires, wherein (i) the additional sensing wires are electrically connected with the electric power supply unit and (ii) the electric power supply unit is configured for supplying an additional electric current to each one of the additional sensing wires, in particular for heating the additional sensing wires. Further, (i) the additional sensing wires are electrically connected with the measurement unit and (ii) the measurement unit is configured for measuring, for each one of the additional sensing wires, an ohmic resistance change resulting from a cooling of the respective additional sensing wire caused by particles of the liquid spray stream impinging onto the respective additional sensing wire. Furthermore, a first axis being defined by the parallel sensing wires of the first grid and a second axis being defined by the parallel additional sensing wires of the second grid enclose a slanted angle.

With the described pattern comprising two grids of parallel sensing wires the spatial flow distribution of the ejected liquid spray stream may be determined along two directions. Thereby, a first direction along which the spatial flow distribution can be determined is along an axis which (a) is located within the plane being spanned by the parallel sensing wires of the first grid which (b) is oriented perpendicular to the longitudinal extension of the sensing wires of the first grid. Correspondingly, the second direction is along another axis which (a) is located within the plane being spanned by the parallel sensing wires of the second grid which (b) is oriented perpendicular to the longitudinal extension of the sensing wires of the second grid.

The slanted angle may be any angle being different from 0° and 180°. This means that the first axis being defined by the parallel sensing wires of the first grid and the second axis being defined by the parallel sensing wires of the second grid are arranged with respect to each other in a non-parallel arrangement.

Since the spatial flow distribution of the liquid spray steam can be measured along two different directions a two dimensional analysis of the spatial (and temporal) flow distribution of the liquid spray stream may be realized. This give detailed information about the spatial spray characteristics.

In some embodiments, the first axis and the second axis enclose an angle of 90° or at least approximately 90°. This may provide the advantage that the spatial flow distribution of the liquid spray stream may be determined within a two-dimensional Cartesian coordinate system. Thereby, the plane of the two-dimensional Cartesian coordinate system may be defined (a) by an x-axis which (a1) is located within the plane being spanned by the parallel sensing wires of the first grid and which (a2) is oriented perpendicular to the longitudinal extension of the sensing wires of the first grid and (b) by a y-axis which (b1) is located within the plane being spanned by the parallel sensing wires of the second grid and which (b2) is oriented perpendicular to the longitudinal extension of the sensing wires of the second grid. This accordingly defined plane of the two-dimensional Cartesian coordinate system may be oriented perpendicular to a main ejection axis of the liquid spray stream. Thereby, the main ejection axis may be a symmetry axis of the liquid spray stream.

In some embodiments, a first plane defined by the first grid of parallel sensing wires and a second plane defined by the second grid of parallel sensing wires are oriented at least approximately parallel with respect to each other. With such a parallel arrangement of the two grids of respectively parallel sensing wires the two-dimensional determination of the spatial characteristics of the liquid spray stream may be accomplished in a precise and reliable manner.

In some embodiments, at least some and preferably all sensing wires are provided with an insulating coating, which ensures that each one of any one of the sensing wires is electrically insulated from any one of the other sensing wires. In other words, this ensures that the sensing wires are mutually electrically insulated.

By insulating the sensing wires from one another, it can be made sure that there are no crosstalk effects between different sensing wires. As a consequence, disturbances which may have a negative impact onto the reliability and/or on the accuracy of the measurements performed with the described measurement device can be eliminated effectively.

In some embodiments, the measurement device further comprises at least one further grid of parallel sensing wires, which further grid comprises at least two parallel further additional sensing wires which can be positioned within the spray volume of the liquid spray stream. The further additional sensing wires are electrically connected with the electric power supply unit and the electric power supply unit is configured for supplying an additional electric current to each one of the further additional sensing wires, in particular to heat the further additional sensing wires. Further, (i) the further additional sensing wires are electrically connected with the measurement unit and (ii) the measurement unit is configured for measuring, for each one of the further additional sensing wires, an ohmic resistance change resulting from a cooling of the respective further additional sensing wire caused by particles of the liquid spray stream impinging onto the respective further additional sensing wire. Furthermore, a third axis being defined by the parallel further additional sensing wire encloses a slanted angle with respect to both the first axis and the second axis.

Using at least three grids of parallel sensing wires may provide the advantage that the ejected liquid spray stream can be spatially analyzed along three different directions. When evaluating the signals consisting of a plurality of ohmic resistance changes this allows for employing the principles of geometrical tomography. As a consequence, the accuracy of the described measurement device will be further improved.

In some embodiments, all grids of parallel sensing wires are arranged within one common grid plane. This may provide the advantage that the concept of geometrical tomography can be applied in a simple manner which allows to determine the spatial (and temporal) flow distribution of the liquid spray system with a simple microprocessor having only a comparatively small computational power. That the grids are arranged within a common grid plane is in particular to be understood that the grids form a grid system having a dimension in a direction perpendicular to the longitudinal extensions of the sensing wires is as small as possible. Of course, the wires are not completely contained in a plane in the strict mathematical sense due to their thicknesses and their intersections.

In some embodiments, the measurement device comprises six of the above-mentioned further grids such that altogether eight grids of parallel sensing wires are provided. The eight grids are preferably distributed within the common grid plane. They are arranged in such a manner that in between two angularly neighboring grids an angle of 22.5° is enclosed.

Using an angle of 22.5° between two angularly neighboring grids of parallel sensing wires will result in a highly symmetric arrangement of the various grids within the common grid plane (8×22.5°=180°). This may provide the advantage that the measurement accuracy of the measurement system can be increased significantly because in particular the principles of geometrical tomography can be exploited effectively.

In some embodiments, the measurement device further comprises a translation unit, which is configured for spatially translating a grid system along a translation axis in such a manner that a distance between the grid system and the nozzle varies. The grid system comprises the first grid, the second grid and, if applicable, the at least one further grid.

With the described translation unit, the spatial positions of the various grids within the spray volume can be varied in a collective manner. As a consequence, the flow distribution of the liquid spray stream can be measured at different positions within the spray volume. For example, the flow distribution of the liquid spray stream can first be measured within a first grid plane having a first distance with respect to the nozzle. Thereafter, the grid system may be spatially shifted along the translation axis to a second grid plane having a second distance with respect to the nozzle. The translation axis may be in particular perpendicular to the above mentioned common grid plane and/or parallel to the main ejection axis of the fluid spray. Then, at the position corresponding to the second grid plane, the flow distribution of the liquid spray stream can be measured again. This procedure can be repeated at a plurality of positions along the translation axis until the spatial and/or temporal flow distribution within at least a part of the total spray volume is determined.

In some embodiments, the first grid, the second grid and, if applicable, the at least one further grid form a first grid system which can be positioned within the spray volume of the liquid spray system at a first distance with respect to the nozzle. The measurement device further comprises at least one second grid system which comprises at least two grids of parallel sensing wires according to at least one of the above-described embodiments of the first grid system. Expediently, (i) these sensing wires are electrically connected with the electric power supply unit and (ii) the electric power supply unit is configured for supplying an additional electric current to each one of these sensing wires, in particular for heating these sensing wires. Further, (i) these sensing wires are electrically connected with the measurement unit and (ii) the measurement unit is configured for measuring, for each one of these sensing wires, an ohmic resistance change resulting from a cooling of the respective sensing wire caused by particles of the liquid spray stream impinging onto the respective sensing wire.

This may make it possible to measure simultaneously the spatial and/or temporal flow distribution of the liquid spray stream within two different measurement planes within the spray volume. Thereby, each measurement plane is respectively defined by one common plane of the respective grids being assigned to the respective grid system.

There is no limit for the number of grid systems being employed by the described measurement device. However, when deciding about the number of employed grid systems one should take into account that each grid system disturbs at least a little bit in particular the spatial flow distribution of the liquid spray stream which will develop in the spatial region being located downstream with respect to the respective grid system. As a consequence, the disturbance effects of a several grid system overlay each other such that when the number of grid systems is too high the measurement accuracy of the described measurement device may be deteriorated. Thereby, measurement deterioration within a certain region of the spray volume depends on the number of grid systems which are located upstream with respect to that region, although such a measuring deterioration can be reduced when using thin sensing wires.

In some embodiments, both grid planes of the grid systems are arranged parallel with respect to one another such that there is a predefined distance between the two grid systems. This may allow both grid systems to be placed in a straight and/or even manner within a common Cartesian coordinate system of the described measurement device. As a consequence, the evaluation of the measurement signals can be carried out with a comparatively small computational effort.

The spatial and/or temporal flow distribution of the liquid spray stream can be measured at two different measurement planes within the spray volume within one measurement process. The two different planes have a different distance with respect to the nozzle.

A method for measuring a flow distribution of a liquid spray stream which has been atomized by a nozzle, in particular for measuring a flow distribution of a fuel spray stream which has been atomized by an injection valve for a vehicle comprises (a) positioning a sensing wire within a spray volume of the liquid spray stream, (b) supplying an electric current flowing through the sensing wire by means of an electric power supply unit which is electrically connected with the sensing wire, and (c) measuring an ohmic resistance change of the sensing wire resulting from a cooling of the sensing wire caused by particles of the liquid spray stream impinging onto the sensing wire by means of a measurement unit which is electrically connected with the sensing wire. In particular, the electric current through the sensing wire is provided by the electric power supply unit for heating the sensing wire. In some embodiments, a temporal evolution of the liquid spray stream is measured.

The sensing wire will be cooled down at least partially when liquid particles of the spray stream impinge on the wire. In some embodiments, the cooling effect caused by the impinging particles is determined by measuring the ohmic resistance of the sensing wire, which will change in response to the cooling effect. Thereby, the degree of the resistance change is determined by the mass flow of the impinging liquid particles.

In some embodiments, the measurement method comprises positioning a sensing wire and at least one further sensing wire which are arranged in parallel with respect to each other and form a first grid of parallel sensing wires within a spray volume of the liquid spray stream and positioning a second grid of parallel sensing wires, which second grid comprises at least two parallel additional sensing wires within the spray volume of the liquid spray stream. A first axis being defined by the parallel sensing wires of the first grid and a second axis being defined by the parallel additional sensing wires of the second grid enclose a slanted angle. The method according to this embodiment further comprises supplying an electric current flowing through the sensing wire, a further electrical current through the further sensing wire and an additional electric current flowing through each of the additional sensing wires by means of an electric power supply unit which is electrically connected with the sensing wire, the further sensing wire and the additional sensing wires. An ohmic resistance change of the sensing wire, the further sensing wire and each of the additional sensing wires resulting from a cooling of the respective sensing wire caused by particles of the liquid spray stream impinging onto the respective sensing wire is measured by means of a measurement unit which is electrically connected with the sensing wire, the further sensing wire and each of the additional sensing wires. Preferably, a spatial distribution of the liquid spray stream is measured in two non-parallel spatial directions in the plane which is defined by the first axis and the second axis.

Some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present device and method are apparent from the examples of embodiment to be described hereinafter and are explained with reference to the examples of embodiments. The device and method will be described in more detail hereinafter with reference to examples of embodiment but to which the invention is not limited.

DETAILED DESCRIPTION

In different figures, similar or identical elements or features are provided with the same reference signs or with reference signs which are different from the corresponding reference signs only within the first digit. In order to avoid unnecessary repetitions elements or features which have already been elucidated with respect to a previously described embodiment are not elucidated again at a later position of the description.

Figure 1:
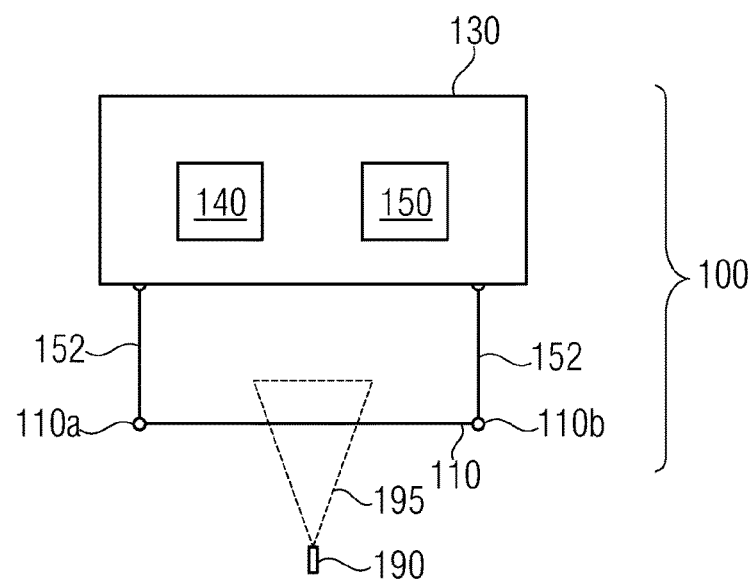
FIG. 1 shows a measurement device comprising a single sensing wire according to the teachings of the present disclosure.
Figure 2A:
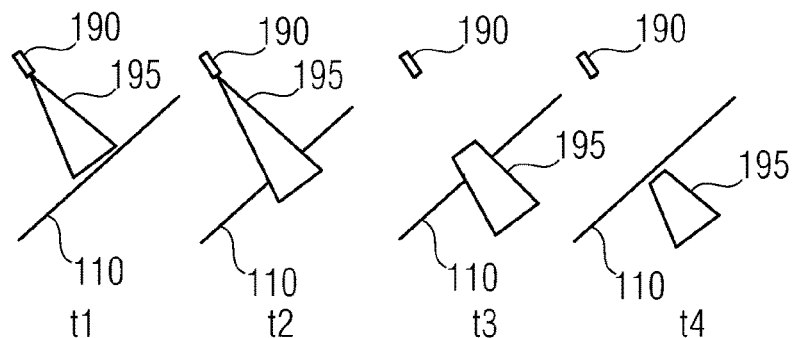
FIGS. 2a and 2b illustrate the basic principle of measuring the temporal course of a flow distribution of a liquid spray stream which has been atomized by a nozzle by employing the measurement device shown in FIG. 1.
Figure 2B:
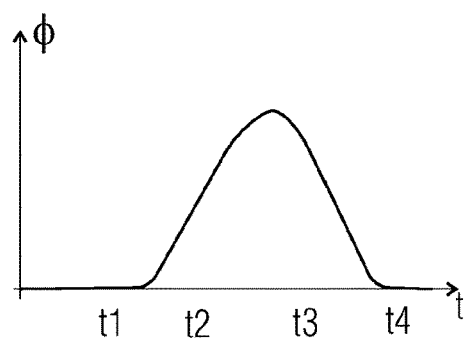
Figure 3A:
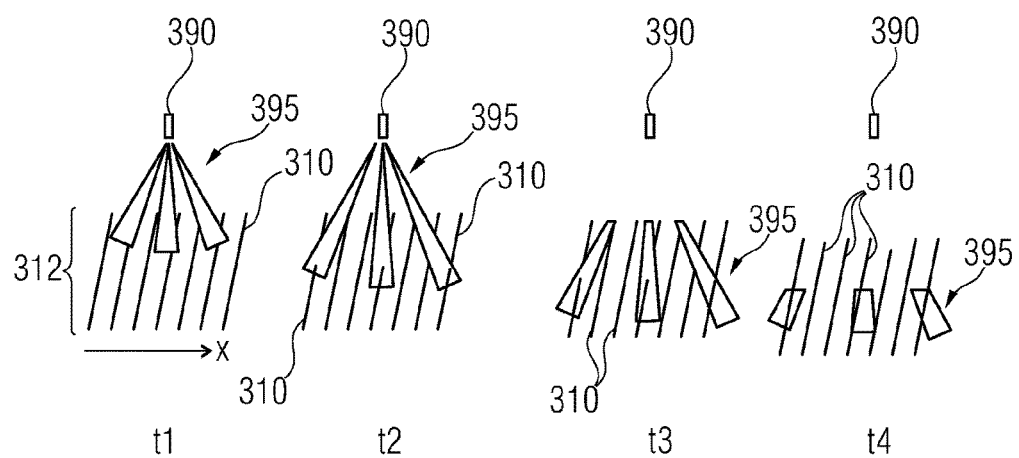
FIGS. 3a and 3b illustrate the basic principle of measuring the temporal course and along one axis the spatial course of a flow distribution of a liquid spray stream which has been atomized by a nozzle by employing a measurement device comprising a plurality of parallel arranged sensing wires.
Figure 3B:
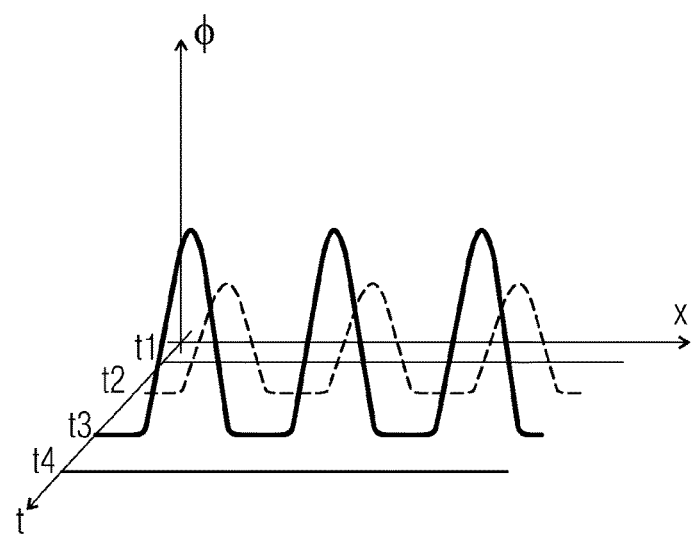

FIG. 1 shows an example measurement device 100 according to teachings of the present disclosure. The measurement device 100 comprises a sensing wire 110, which is connected, via two connection leads 152, with a control unit 130.

The control unit 130 comprises an electric power supply unit 140 and a measurement unit 150. During operation, the electric power supply unit 140 drives an electric current through the sensing wire 110. This electric current heats up the sensing wire until in a thermal condition of equilibrium the sensing wire 110 adopts a certain temperature.

When particles of a liquid spray stream 195, which has been ejected by a nozzle 190, impinge onto the sensing wire 110, the temperature of the sensing wire 110 will decrease. As a consequence, the ohmic resistance of the sensing wire 110 will also decrease. Thereby, the amount of the decrease of the ohmic resistance of the sensing wire 110 will be indicative for the intensity of the liquid flow stream 195.

According to the embodiment described here the electric current is provided by a voltage source of the electric power supply unit 140. As a consequence, when the ohmic resistance of the sensing wire 110 decreases, the current flowing between an input end 110a and an output end 110b of the sensing wire 110 increases. This current increase is measured by the measurement unit.

The single sensing wire 110 is able to measure instantaneously the mass flow of the liquid spray stream 195 impinging onto the sensing wire 110. This is achieved by heating up the sensing wire 110 with an electric current, which is provided by the electric power supply unit 140. The sensing wire 110 is suspended within the liquid spray stream 195 like a toaster wire. The wire's electrical resistance increases as the wire's temperature increases, which limits electrical current flowing through the sensing wire 110. When particles of the liquid spray stream 395 hit the sensing wire 110, the sensing wire 110 cools down and, as a consequence, decreases its resistance, which in turn allows a higher current to flow through the sensing wire 110. As a higher current flows, the temperature of the sensing wire 110 increases until the temperature (and resistance) reach thermal equilibrium again. The amount of current required to maintain the temperature of the sensing wire 110 is proportional to the mass of the flow of the liquid spray stream 195 hitting the sensing wire 110. An integrated electronic circuit being comprised in the measurement unit 150 converts the measurement result of the current into a corresponding voltage signal. This voltage signal is indicative for the amount of the flow of the liquid spray stream 195 hitting the sensing wire 110.

FIGS. 2*a* and 2*b* illustrate the basic principle of measuring a flow distribution of a liquid spray stream 195 which has been atomized by a nozzle 190 by employing the measurement device 100 shown in FIG. 1. Since only one single sensing wire 110 is used, only the temporal course of a flow distribution of the part of the liquid spray stream 195 can be measured which part impinges onto the sensing wire 110.

FIG. 2*a* illustrates the temporal development of the liquid spray stream 195 at time points t1, t2, t3 and t4, which liquid spray stream 195 has been atomized by the nozzle 190 at a time t=0. FIG. 2*b* shows the dependency of the corresponding flow Φ of the liquid spray stream 195 impinging onto the sensing wire 110 on the time t.

FIGS. 3*a* and 3*b* illustrate the basic principle of measuring not only the temporal course of a flow distribution of a liquid spray stream 395 but also the spatial dependency of the flow distribution along one direction, here called the x-direction. In order to achieve this, the corresponding measurement device comprises not only one but a plurality of sensing wires 310 which form a grid 312 of parallel sensing wires 310. Thereby, in accordance with the sensing wire 110 of the measurement device 100 shown in FIG. 1, each one of the parallel sensing wires 310 is connected both to a not shown electric power supply unit and to a not shown measurement unit. This means that in accordance with the signal processing elucidated above for the single sensing wire 110 the current through each sensing wire 310 is measured. Again, for each sensing wire 310 the increase of the current compared to a thermal state of equilibrium is indicative for the amount of liquid flow stream 395 impinging onto the respective sensing wire 310.

FIG. 3*a* illustrates the temporal development and the spatial development along the x-direction of the liquid spray stream 395 at time points t1, t2, t3 and t4, which liquid spray stream 395 has been atomized by a nozzle 390 at a time t=0. FIG. 3*b* shows the dependency of the corresponding flow of the liquid spray stream 395 impinging onto the sensing wires 310 on the time t and on the position x along the x-direction.

FIG. 4*a* shows a grid system 414 comprising eight different grids each having 25 sensing wires which are arranged within one common grid plane. The eight grids are distributed within the common grid plane in such a manner that in between two angularly neighboring grids an angle of 22.5° is enclosed. Again, each sensing wire of each grid is electrically insulated from all other sensing wires. Further, each sensing wire is, in accordance with the sensing wire 110 of FIG. 1, connected both to a non-depicted electric power supply unit and to a non-depicted measurement unit.

FIG. 4*b* shows a visualization of a spatial two-dimensional flow distribution which has been measured by a measurement device comprising the grid system 414 shown in FIG. 4*a*.

Various embodiments of the measurement device use a combination of several series of electrical conductible insulated sensing wires and the concept of geometrical tomography (retrieval of information about a geometric object from data concerning its projections on planes). This kind of measurement has a very low response time and then can be used to give an almost continuous measurement.

Using the grid system 414, wherein a number of grids (e.g., eight grids) each comprising parallel sensing wires (e.g., 25 wires) are angled with respect to each other, provides a measurement device being capable of measuring the flow distribution of a liquid spray stream vs. x, y and vs. time. Thereby, an algorithm similar to the one used in tomography imaging can be used.

According to the embodiment described here the grid system 414 is a 50 mm diameter pattern build out of 8 grids of 25 wires each with a 22.5° angular spacing between angularity neighbored grids. Accordingly, the grid system 414 described here includes 200 sensing wires, each of them has a controlled current flowing through it. A not depicted electronic microprocessor is able to measure the current for each sensing wire, and then to calculate the flow impinging onto the respective sensing wire. This allows for calculating a visualization as shown in FIG. 4*b* which can change with time. This means that one is able to characterize the two dimensional spatial dependency of a liquid spray stream shape in a dynamic mode. For high frequency pulsed sprays, a device like this would allow to measure an event to event deviation.

Figure 4A:
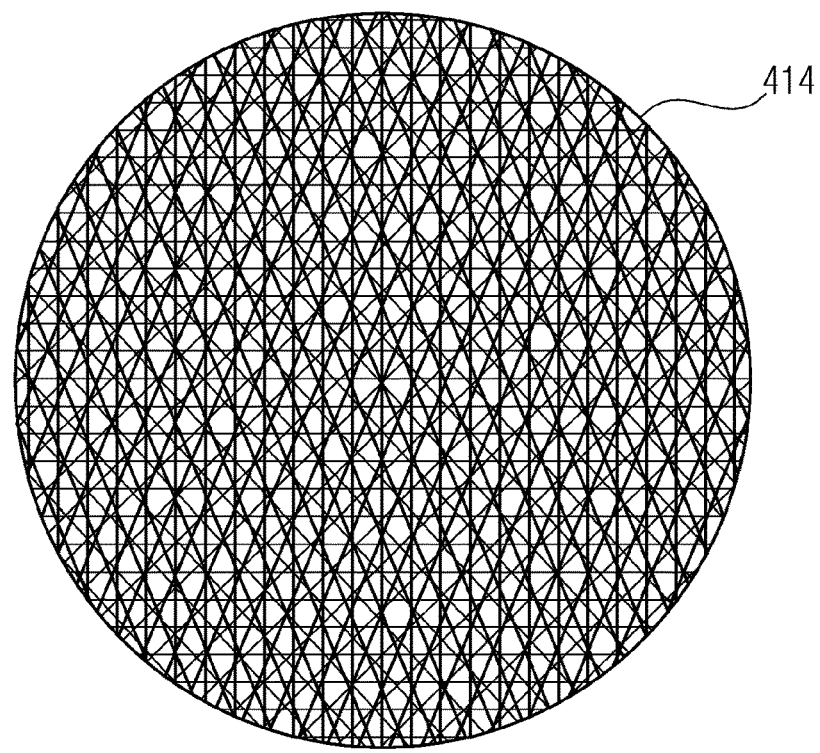
FIG. 4a shows a grid system comprising eight different grids each having 25 sensing wires which are arranged within one common grid plane, wherein the eight grids are distributed within the common grid plane in such a manner that in between two angularly neighboring grids an angle of 22.5° is enclosed.
Figure 4B:
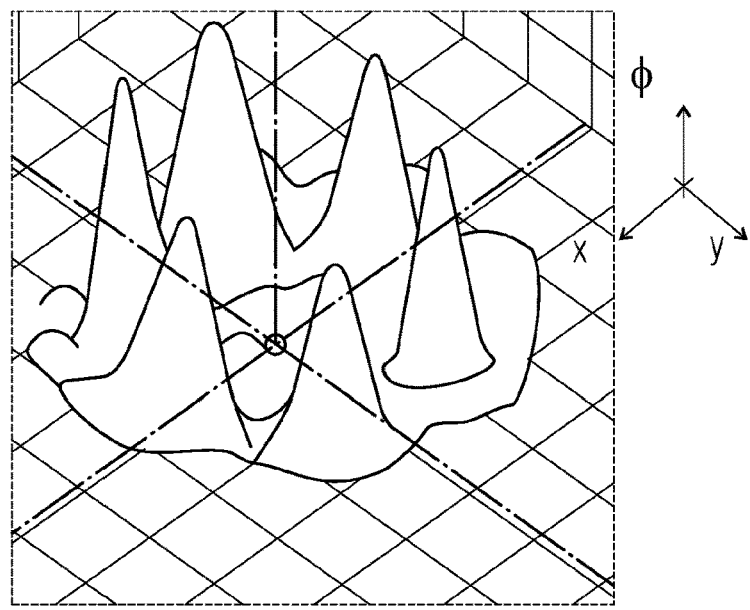
FIG. 4b shows a visualization of a spatial two-dimensional flow distribution.
Figure 5:
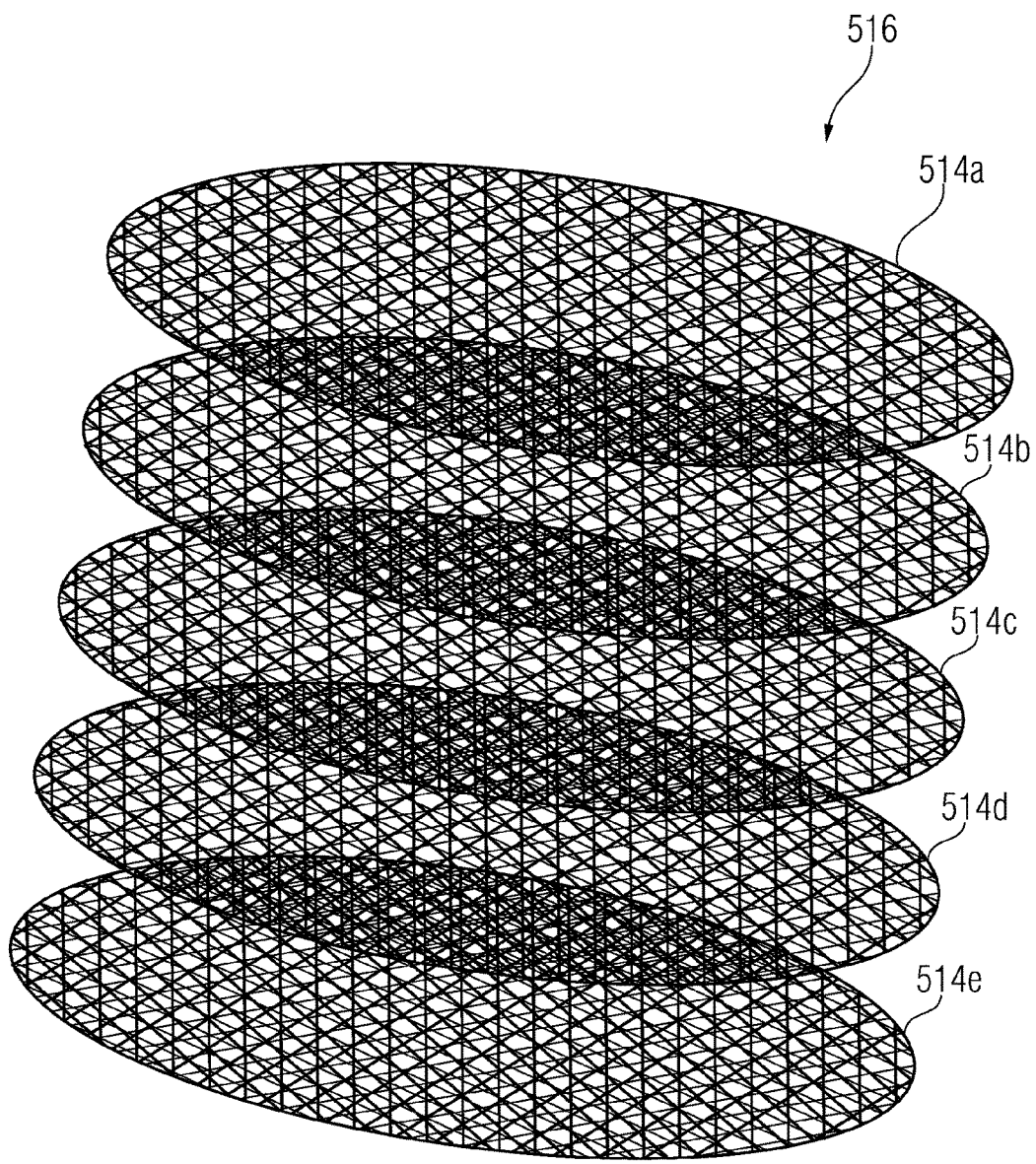
FIG. 5 shows a grid arrangement comprising five grid systems as shown in FIG. 4a, which grid arrangement can be used for measuring the spatial flow distribution of a liquid spray stream within a three dimensional measurement region.

FIG. 5 shows a grid arrangement 516 comprising five grid systems 514a, 514b, 514c, 514d and 514e. Each one of the five grid systems 514a-e corresponds to the grid system 414 shown in FIG. 4a. Each sensing wire of the whole grid arrangement 516 is electrically insulated from all other sensing wires. Further, each sensing wire is, in accordance with the sensing wire 110 of FIG. 1, connected both to a non-depicted electric power supply unit and to a non-depicted measurement unit.

With the grid arrangement 516 the spatial flow distribution of a liquid spray stream within a three dimensional measuring region can be measured and the flow distribution of a liquid spray stream vs. x, y, z and vs. time can be measured.

Such a three dimensional and time dependent measurement of the flow distribution of a liquid spray stream could also be realized by a single grid system which is moved by means of a translation unit along a translation axis in such a manner that a distance between the grid system and the nozzle is varied. Then, for each distance (e.g. a certain z-position of the grid system) a two dimensional (along x- and y-direction) and time dependent measurement can be accomplished.

The measurement devices according to the teachings of the present disclosure provide the advantage that a liquid spray stream can be dynamically measured and, compared to known measurement systems, can be measured with a higher resolution. Thereby, the sensing wire size or diameter and the displacement between two neighboring sensing wires can be much smaller respectively closer as compared to the cell size of known measurement systems, which are described in the introductory portion of this document.

It should be noted that the term "comprising" does not exclude other elements or steps and the use of articles "a" or an does not exclude a plurality. Also elements described in association with different embodiments may be combined. It should also be noted that reference signs in the claims should not be construed as limiting the scope of the claims.

What is claimed is:

1. A measurement device for measuring a flow distribution of a liquid spray stream which has been atomized by a nozzle, the measurement device comprising:
   a plurality of first sensing wires positioned within a spray volume of the liquid spray stream and arranged in parallel with respect to each other to form a first array of parallel first sensing wires, the first array defining a plane;
   an electric power supply unit electrically connected with the plurality of sensing wires and configured to supply an electric current flowing through the plurality of sensing wires,
   a measurement unit electrically connected to the plurality of sensing wires for measuring an ohmic resistance change of each sensing wire of the plurality of sensing wires resulting from a cooling of the respective sensing wire, and
   a second array of parallel second sensing wires comprising a plurality of second parallel additional sensing wires parallel to each other in the plane and non-parallel to the first sensing wires,
   wherein the sensing wires of the second array are electrically connected to the electric power supply unit for an additional electric current to each one of the sensing wires in the second grid,
   wherein the sensing wires of the second array are electrically connected with the measurement unit for measuring, for each one of the sensing wires of the second array, an ohmic resistance change, and
   wherein a first axis defined by an extent of the parallel sensing wires of the first array and a second axis defined by an extent of the parallel additional sensing wires of the second array define a first angle, and
   a third array of parallel third sensing wires, the third array comprising a plurality of parallel third sensing wires electrically connected with the electric power supply unit for supplying an additional electric current to each one of the plurality of third sensing wires,
   wherein each third sensing wire is parallel to the other third sensing wires in the plane and non-parallel to the first sensing wires and non-parallel to the second sensing wires, and
   wherein each of the plurality of third sensing wires are electrically connected with the measurement unit for measuring a respective ohmic resistance change.

2. The measurement device as set forth in claim 1, wherein the first axis and the second axis enclose an angle of at least approximately 90°.

3. The measurement device as set forth in claim 1, wherein at least some sensing wires comprise an insulating coating.

4. The measurement device as set forth in claim 1, further comprising five further arrays such that altogether eight arrays of parallel sensing wires are provided, wherein the eight arrays are distributed within the plane in such a manner that in between two angularly neighboring arrays an angle of 22.5° is enclosed.

5. The measurement device as set forth in claim 1, further comprising a translation unit configured for spatially translating one or more arrays along a translation axis in such a manner that a distance between the one or more arrays and the nozzle is variable.

6. The measurement device as set forth in claim 1, wherein the first array and the second array and the third array form a first grid system which can be positioned within the spray volume of the liquid spray system at a first distance with respect to the nozzle,
   wherein the measurement device further comprises at least one second grid system comprising at least three arrays of parallel sensing wires electrically connected with the electric power supply unit for supplying an additional electric current to each one of these sensing wires, and
   wherein these sensing wires are electrically connected with the measurement unit for measuring, for each one of these sensing wires, an ohmic resistance change.

7. The measurement device as set forth in claim 6, wherein both the first grid system and the at least one second grid system are arranged parallel with respect to each other such that there is a predefined distance between the two grid systems.

* * * * *